(12) United States Patent
Kwon et al.

(10) Patent No.: US 11,804,224 B2
(45) Date of Patent: Oct. 31, 2023

(54) ELECTRONIC DEVICE AND METHOD FOR OPERATION THEREOF

(71) Applicant: Samsung Electronics Co., Ltd., Gyeonggi-do (KR)

(72) Inventors: Wooup Kwon, Gyeonggi-do (KR); Kyounggu Woo, Gyeonggi-do (KR); Sangyong Park, Gyeonggi-do (KR); Jongbeom Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 17/260,294

(22) PCT Filed: May 28, 2019

(86) PCT No.: PCT/KR2019/006385
§ 371 (c)(1),
(2) Date: Jan. 14, 2021

(87) PCT Pub. No.: WO2020/017754
PCT Pub. Date: Jan. 23, 2020

(65) Prior Publication Data
US 2021/0295838 A1    Sep. 23, 2021

(30) Foreign Application Priority Data
Jul. 20, 2018    (KR) .................. 10-2018-0084901

(51) Int. Cl.
*G10L 15/22*    (2006.01)
*G10L 15/04*    (2013.01)
(Continued)

(52) U.S. Cl.
CPC .............. *G10L 15/22* (2013.01); *G10L 15/04* (2013.01); *G10L 15/30* (2013.01); *G10L 17/12* (2013.01); *G10L 2015/223* (2013.01)

(58) Field of Classification Search
USPC ..................................................... 704/1–504
See application file for complete search history.

(56) References Cited

U.S. PATENT DOCUMENTS 10,192,557 B2    1/2019   Lee et al.
11,032,374 B2 *  6/2021   Je ........................... H04L 67/125
(Continued)

FOREIGN PATENT DOCUMENTS

JP       2014-115446 A    6/2014
KR   10-2016-0055162 A    5/2016
(Continued)

OTHER PUBLICATIONS

Korean Office Action dated Feb. 21, 2023.
Notice of Patent Grant dated Jul. 18, 2023.

*Primary Examiner* — Marcus T Riley
(74) *Attorney, Agent, or Firm* — Cha & Reiter, LLC

(57) ABSTRACT

Various embodiments of the present disclosure relate to a method for providing an intelligent assistance service and an electronic device for performing the same. According to an embodiment, an electronic device comprises at least one communication circuit, at least one microphone, at least one speaker, at least one processor operatively connected to the communication circuit, the microphone, and the speaker, and at least one memory electrically connected to the processor, wherein the memory has instructions stored therein which, when executed, cause the processor to receive a wake-up utterance calling a voice-based intelligent assistance service, in response to the wake-up utterance, to identify a session which is in progress by the voice-based intelligent assistance service, and, upon receiving a control command, to provide the control command to an external device through the session on the basis of the session. Other embodiments are also possible.

15 Claims, 15 Drawing Sheets

(51) Int. Cl.
*G10L 15/30* (2013.01)
*G10L 17/12* (2013.01)

(56) References Cited

U.S. PATENT DOCUMENTS

| | | | |
|---|---|---|---|
| 11,222,635 B2 * | 1/2022 | Kang | G06F 3/0488 |
| 2014/0222436 A1 | 8/2014 | Binder et al. | |
| 2014/0334645 A1 | 11/2014 | Yun et al. | |
| 2015/0244642 A1 | 8/2015 | Smith et al. | |
| 2016/0260431 A1 * | 9/2016 | Ewen | G10L 15/32 |
| 2017/0359334 A1 | 12/2017 | Maddox et al. | |
| 2018/0040324 A1 | 2/2018 | Wilberding | |
| 2018/0096690 A1 * | 4/2018 | Mixter | G10L 21/0216 |
| 2019/0075167 A1 * | 3/2019 | Je | G06F 3/167 |
| 2020/0020334 A1 * | 1/2020 | Kang | G06F 3/167 |
| 2021/0274001 A1 * | 9/2021 | Je | H04W 76/14 |
| 2021/0295838 A1 * | 9/2021 | Kwon | G10L 15/30 |
| 2022/0130388 A1 * | 4/2022 | Kang | G06F 3/0488 |

FOREIGN PATENT DOCUMENTS

| | | | |
|---|---|---|---|
| KR | 10-2017-0081390 A | | 7/2017 |
| WO | 2018/005334 A1 | | 1/2018 |

* cited by examiner

ELECTRONIC DEVICE AND METHOD FOR OPERATION THEREOF

CROSS REFERENCE TO RELATED APPLICATIONS

This application is a National Phase Entry of PCT International Application No. PCT/KR2019/006385, which was filed on May 28, 2019, and claims a priority to Korean Patent Application No. 10-2018-0084901, which was filed on Jul. 20, 2018, the contents of which are incorporated herein by reference.

TECHNICAL FIELD

Various embodiments of the present disclosure relate to a method for providing an intelligent assistance service and an electronic device performing the same.

BACKGROUND ART

Recently, intelligent assistance services have been developed that provides an intuitive interface between users and electronic devices. The intelligent assistance service infers the user's intention by performing natural language processing on the user's utterance, and process the control device based on the inferred user's intention.

DISCLOSURE OF DISCLOSURE

Technical Problem

An electronic device that provides an intelligent assistance service identifies a control target based on a result of natural language processing for an utterance of a user. In other words, in order to use the intelligent assistance service, the utterance of the user should explicitly include a control device which is the control target.

Here, there is a problem in that the control device should be repeatedly included in the utterance even if the user continuously controls the same control device.

Various embodiments of the present disclosure provide an apparatus and a method for processing an utterance that does not include information about a control device in an electronic device.

Various embodiments of the present disclosure provide an apparatus and a method for controlling, in an electronic device, an utterance that does not include information about a control device to be processed by a control device that has processed a previous utterance.

Various embodiments of the present disclosure provide an apparatus and a method for providing an indication on a control device that has processed a previous utterance in response to receiving a wake-up utterance in an electronic device.

Solution to Problem

An electronic device according to various embodiments of the present disclosure includes a user interface; at least one communication circuit; at least one microphone; at least one speaker; at least one processor operatively coupled to the user interface, the communication circuit, the microphone, and the speaker; and at least one memory electrically coupled to the processor, wherein the memory stores instructions that, when executed, cause the processor to, in a first operation, receive a wake-up utterance for calling a voice-based intelligent assistance service through the microphone, and, in response to the wake-up utterance, provide a first indication using at least one of the user interface or the speaker, and in a second operation, during a selected session of the voice-based intelligent assistance service, receive the wake-up utterance through the microphone and in response to the wake-up utterance, provide a second indication different from the first indication using at least one of the user interface or the speaker.

A system according to various embodiments of the present disclosure includes a communication interface; a processor operatively coupled to the communication interface; and at least one memory electrically coupled to the processor, wherein the memory stores instructions that, when executed, cause the processor to receive an information request for a session of a voice-based intelligent assistance service through the communication interface from an electronic device including a user interface, a speaker, and a microphone, confirm the session information of the voice-based intelligent assistance service, and, if the voice-based intelligent assistance service is during a selected session, transmit the information related to the selected session to the electronic device.

A method for processing an utterance in an electronic device according to various embodiments of the present disclosure includes: receiving a wake-up utterance for calling a voice-based intelligent assistance service; confirming a session in progress (on-going) by the voice-based intelligent assistance service in response to the wake-up utterance; and, when receiving a control command, providing the control command to an external control device through the confirmed session based on the confirmed session.

Advantageous Effects of Invention

According to various embodiments, the operation of an electronic device includes, and the electronic device performs, confirming, in response to a wake-up utterance calling an intelligent assistance service, an ongoing session by the voice-based intelligent assistance service, and providing a received control message (or a control command) to a control device through the session. Thus, it addresses the problem that the control device should be repeatedly included in the utterance of the user each time the user utters. In addition, according to various embodiments, the operation of the electronic device and the electronic device provide, in response to receiving the wake-up utterance, an indication on the control device that processed the previous utterance, so that the user easily identifies the control device that has processed the previous utterance.

BEST MODE FOR CARRYING OUT THE DISCLOSURE

Hereinafter, various embodiments of the present disclosure will be described in detail with reference to the accompanying drawings. In addition, in describing an embodiment of the present disclosure, if it is determined that a detailed description of a related known function or configuration may unnecessarily obscure the subject matter of the present disclosure, a detailed description thereof will be omitted. In addition, terms to be described later are terms defined in consideration of the functions of the present disclosure and varies according to the intention or custom of users or operators. Therefore, the definition should be made based on the contents throughout this specification.

Figure 1:
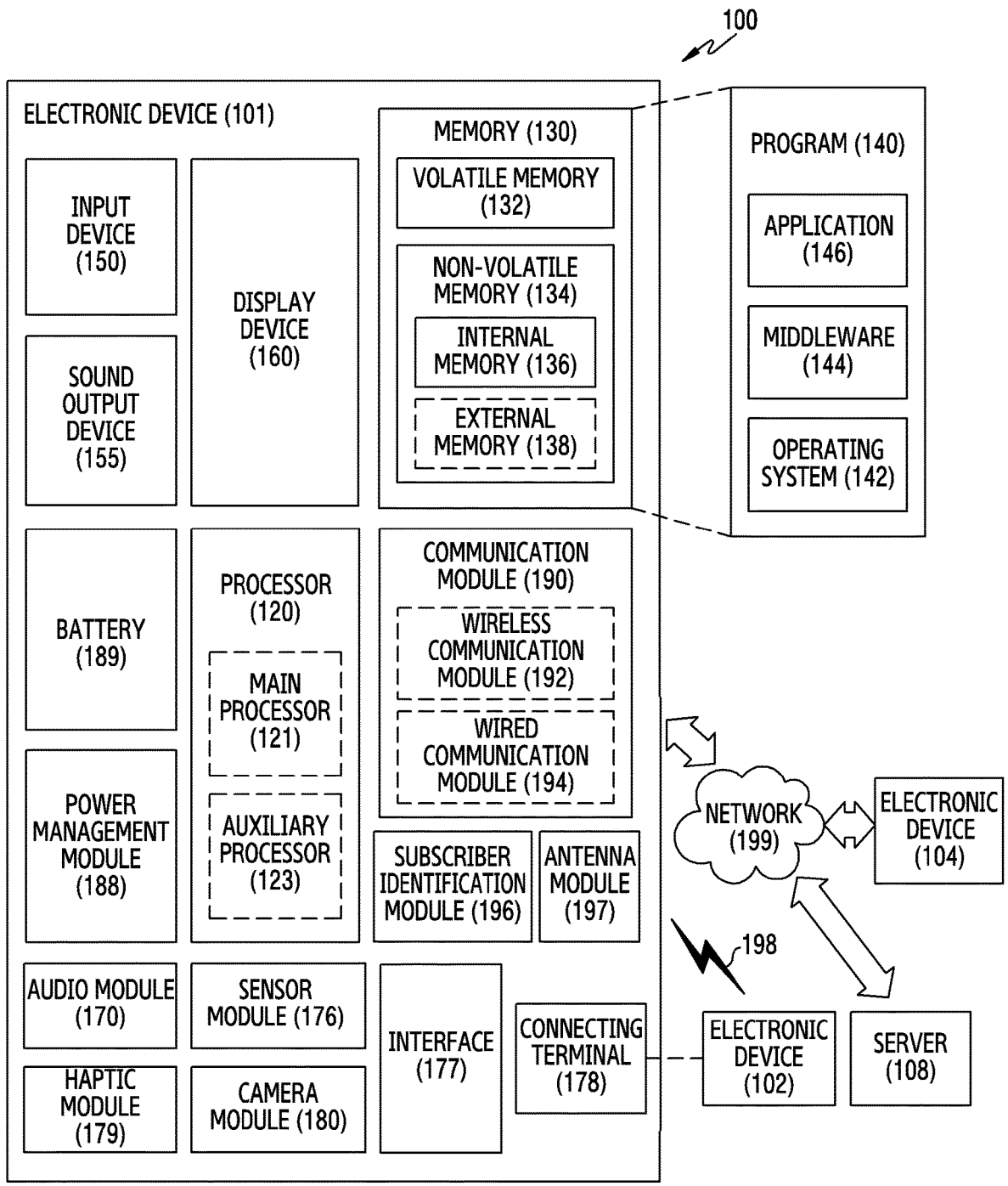
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
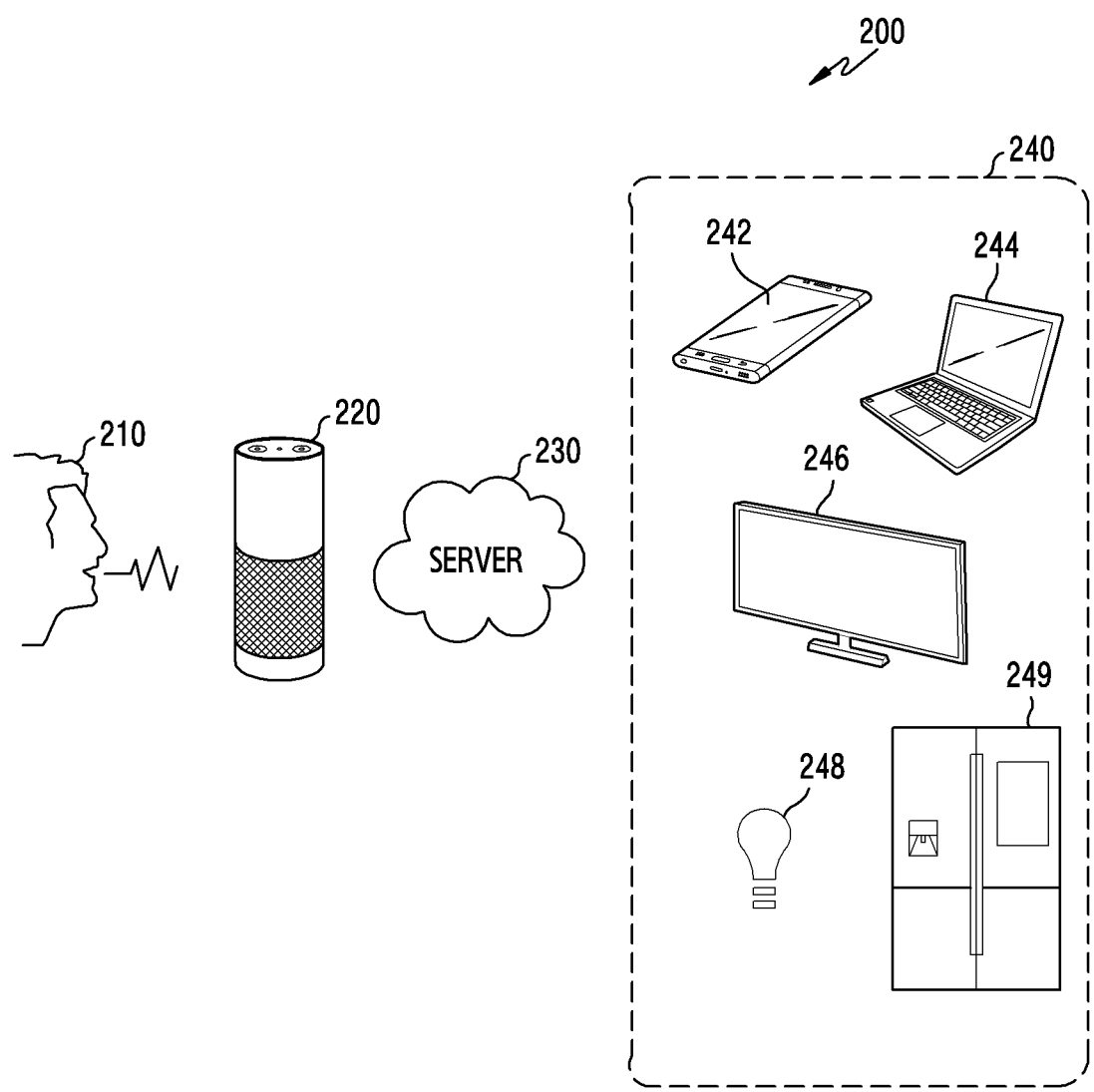
FIG. 2 is a diagram illustrating an example of a remote control system according to various embodiments of the present disclosure.

FIG. 2 is a diagram illustrating an example of a remote control system 200 according to various embodiments of the present disclosure.

Referring to FIG. 2, in various embodiments, the remote control system 200 includes an electronic device 220, a server 230, and a plurality of control devices 240.

According to an embodiment, the electronic device 220 includes various devices including components related to voice recognition and a voice input device (e.g., a microphone). For example, the electronic device 220 includes the electronic device 101 of FIG. 1. The electronic device 220 obtains a voice utterance from the user 210 through the voice input device. Voice utterance includes a wake-up utterance instructing to activate or call the intelligent assistance service and/or a control utterance instructing the operation of hardware/software configurations (e.g., power control, volume control) included in a plurality of control devices. The control utterance is obtained in a state in which the intelligent assistance service is activated or called by the wake-up utterance. The wake-up utterance is a preset keyword such as "hi", "hello", and "high ABC". For example, ABC is a name given to the electronic device 220 (or a voice recognition agent or artificial intelligence (AI)) of the electronic device), such as 'a Galaxy®', etc.

According to an embodiment, the electronic device 220 provides, in response to a wake-up utterance, an indication indicating whether a session formed by an intelligent assistance service exists. For example, the electronic device 220 provides an indication based on session information stored in the electronic device 220 (e.g., the memory 130 in FIG. 1) or session information received from the server 230. The presence of the formed session indicates that there is a target control device designated to perform an operation corresponding to the control utterance. For example, the electronic device 220 performs a first operation providing a first indication indicating that a session does not exist. Also, the electronic device 220 performs a second operation providing a second indication, different from the first indication, indicating that a session exists. The indication indicating whether a session exists (e.g., the first indication, the second indication) is provided at the same time as the intelligent assistance service is activated, or is provided after the intelligent assistance service is activated. In addition, the indication indicating the presence or absence of a session is provided using at least one of a color (e.g., light emission color), a sound, a vibration, and an image.

According to an embodiment, the electronic device 220 provides, in response to the control utterance, the utterance data corresponding to the control utterance to the server 230. The utterance data is pre-processed and transmitted to the server 230 for more accurate utterance recognition.

According to an embodiment, the electronic device 220 receives a result of processing the utterance data from the server 230 in response to transmission of the utterance data. For example, the result of processing utterance data is a result of natural language understanding (interpretation) for utterance data. The natural language understanding result is information about a domain, an intent, and/or a slot obtained by analyzing utterance data. As another example, the result of processing the utterance data includes an execution result indicating whether a control operation corresponding to the control utterance has been performed by the control device 240. The utterance data processing result is output through the electronic device 220 (e.g., display device 160, sound output device 155, etc. in FIG. 1).

According to an embodiment, the server 230 generates a control message (or a control command) based on at least part of utterance data provided through a network from the electronic device 220 and transmits the generated control message to the target control device. The control message is generated based on the analysis result of the utterance data. Analysis of utterance data is performed through natural language processing, as described later in connection with FIG. 3.

According to an embodiment, the server 230 forms a session with the target control device in response to transmitting the control message. Session formation means that the target control device that has processed the utterance data is designated (or maintained) as a control target for a specified period of time. In addition, in response to session formation, the server 230 generates session information indicating that the target control device designated as the control target exists for a specified period of time, as described later in connection with FIG. 3.

According to an embodiment, the server 230 generates a subsequent control message based on at least a portion of the subsequent utterance data corresponding to the subsequent control utterance provided from the electronic device while the session is formed, and transmits the generated subsequent control message to the target control device. The target control device that receives the subsequent control message is determined based on the analysis result of the subsequent utterance data. When the information specifying the target control device is included in the subsequent utterance data, the server 230 transmits the subsequent control message to the target control device specified through the subsequent utterance data. In addition, when information specifying the target control device is not included in the subsequent utterance data, the server 230 transmits a subsequent control message to the target control device in which the session is formed, based on the session information.

According to an embodiment, the plurality of control devices 240 includes a smartphone 242, a computer 244 (e.g., a personal computer, a laptop, etc.), a television 246, a lighting device 248, or a refrigerator 249, and the like. Although not shown, the control devices 240 according to various embodiments further include an air conditioner, a temperature control device, a security device, a gas valve control device, a door lock device, and the like.

According to an embodiment, each of the plurality of control devices 240 is provided with a communication circuit, thereby transmits and receives various information by forming communication with the server 230 using a specified protocol (e.g., Bluetooth, Wi-Fi, Zigbee, etc.). For example, the plurality of control devices 240 transmits information about their own operating state (e.g., device on/off information) to the server 230. In addition, the plurality of control devices 240 receive a control message (e.g., an on/off control command of the device, a command to control other operations of the device, etc.) from the server 230 and execute an operation corresponding to the control message. According to an embodiment, the control device transmits an execution result of an operation corresponding to the control message to the server 230.

Figure 3:
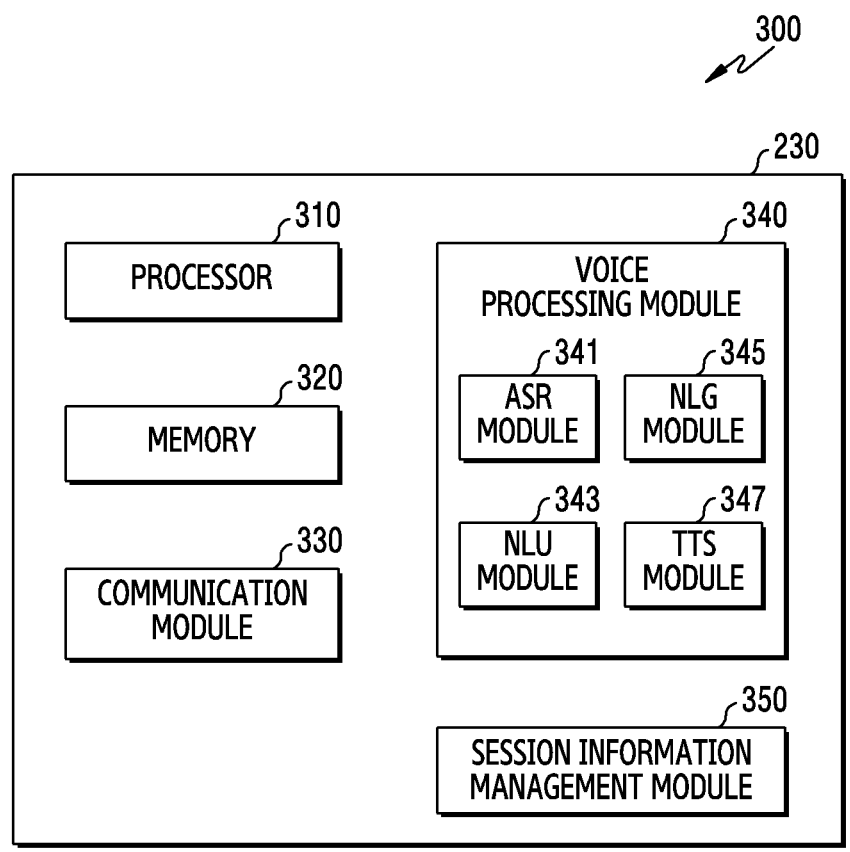
FIG. 3 is a diagram illustrating a configuration of a server according to various embodiments of the present disclosure.

FIG. 3 is a diagram 300 showing the configuration of the server 230 according to various embodiments of the present disclosure.

Referring to FIG. 3, some components of the server 230 correspond to the electronic device 220. For example, the server 230 includes a processor 310, a memory 320, a communication module 330, and the like. According to an embodiment, the server 230 further includes components such as a voice processing module 340 and a session information management module 350.

According to an embodiment, the processor 310 controls a function for performing natural language processing. For example, the processor 310 is connected to the voice processing module 340, the session information management module 350, and the like. The processor 310 controls the voice processing module 340 to perform natural language processing on utterance data received from the electronic device 220. Also, the processor 310 generates a control message based on the natural language processing result of the voice processing module 340 and transmits the control message to the target control device. In addition, in response to transmitting the control message, the processor 310 controls the session information management module 350 to generate session information indicating that a target control device designated as a control target exists for a specified period of time.

The voice processing module 340 performs natural language processing on the utterance data received from the electronic device 220 and determines an intent and/or a domain for a user input. In addition, the voice processing module 340 generates a natural language processing result based on natural language understanding or the like for a user input. According to an embodiment, the voice processing module 340 includes an automatic speech recognition (ASR) module 341, a natural language understanding (NLU) module 343, and a natural language generation (NLG) module (345) and text to utterance (TTS) module 347.

According to an embodiment, the automatic speech recognition module 341 extracts a user's utterance included in utterance data received from the electronic device 220 and generates text data expressed in a designated language based on the extracted utterance. The automatic speech recognition module 341 generates text data using an acoustic model and a language model. The acoustic model includes information related to phonation, and the language model includes information on a combination of unit phoneme information. For example, the automatic speech recognition module 341 converts a user's utterance into text data by using information related to phonation and information on unit phoneme information.

According to an embodiment, the natural language understanding module 343 uses a natural language processing model for text data generated by the automatic speech recognition module 341 to determine an intent for a user input or a matching domain, and obtains components (e.g., slots, task parameters) necessary to express the intention of the user. For example, the natural language understanding module 343 performs syntactic analysis and semantic analysis on utterance data. Based on the analysis result, a domain or an intention corresponding to the utterance is determined, and elements necessary to express the user's intention are obtained. According to an embodiment, the natural language understanding module 343 includes a plurality of natural language understanding modules. Each of the plurality of natural language understanding modules corresponds to each of the plurality of control devices 240. For example, each natural language understanding module refers to a natural language understanding database corresponding to each control device (242, 244, 246, 248, 249) to determine an intent for a user input or to identify a matching domain. According to an embodiment, when there is a control device in which a session is formed, the natural language understanding module 343 processes received utterance data by selecting a natural language understanding module corresponding to the control device in which the session is formed.

According to an embodiment, the natural language generation module 345 generates a natural language format data based on the data generated while performing natural language processing. Natural language format data is the result of understanding natural language. Also, the natural language generation module 345 generates an execution result, in a natural language format, indicating whether a control operation corresponding to the control utterance has been performed by the control device. Information generated in the form of natural language is provided to the electronic device 220 through the communication module 330.

According to an embodiment, the text to utterance module 347 processes data in the form of text generated by the natural language generation module 345 to be provided in a form of voice (utterance). Data provided in the form of voice is provided to the electronic device 220 through the communication module 330.

The session information management module 350 generates session information associated with the target control device that receives the control message in response to transmission of the control message to the target control device by the processor 310. The session information is information indicating that a target control device designated (or maintained) as a control target exists for a specified period of time, and includes information of a device (e.g., electronic device 220) that has received an utterance, information of a target control device that has processed a control message and the session maintenance time (e.g., time designated or maintained as the target control device). This is only exemplary, and embodiments of the present disclosure are not limited thereto. For example, the session information includes various information such as identification information of a speaker, an operation state (e.g., on/off state) of the target control device and etc. The generated session information is stored in the server 230 (e.g., the memory 320) or is provided to the electronic device 220 through the communication module 330.

As described above, the configuration of the electronic device 220 or the server 230 illustrated in FIG. 2 to FIG. 3 are variously modified. For example, the operation of the server 230 (for example, the voice recognition module 341) that extracts the user's utterance included in the utterance data and generates text data expressed in a specified language from the extracted utterance is also performed by the electronic device 220. As another example, the operation of the server 230 (for example, the voice processing module 340) that analyzes utterance data using natural language processing is also performed by the electronic device 220.

An electronic device (e.g., the electronic device 220) according to various embodiments includes a user interface, at least one communication circuit, at least one microphone, at least one speaker, at least one processor (e.g., processor 120) operatively connected to the interface, the communication circuit, the microphone, and the speaker, and at least one memory electrically connected to the processor. According to an embodiment, the memory stores instructions that, when executed, cause the processor, in a first operation, through the microphone, to receive a wake-up utterance for calling a voice-based intelligent assistance service, in response to the wake-up utterance, to provide a first indication using at least one of the user interface or the speaker. According to an embodiment, the memory stores instructions that, when executed, that cause the processor, in a second operation, through the microphone during a selected session of the voice-based intelligent assistance service, to receive the wakeup utterance and provide a second indication different from the first indication using at least one of the user interface or the speaker in response to the wakeup utterance.

According to various embodiments, the instructions, in the second operation, includes an instruction that causes the processor to identify a wake-up speaker corresponding to the received wake-up utterance, and to provide the second indication corresponding to the speaker.

According to various embodiments, the instructions, in the second operation, includes an instruction that causes the processor to check a wake-up time corresponding to the received wake-up utterance, and to provide the second indication corresponding to a wake-up speaker.

According to various embodiments, the first indication and the second indication includes at least one of a color, a sound, a vibration, or an image.

According to various embodiments, the first indication indicates that the selected session of the voice-based intelligent assistance service does not exist, and the second indication indicates that selected session of the voice-based intelligent assistance service exists.

A system (for example, the server 230) according to various embodiments includes a communication interface, a processor (e.g., processor 120) operatively connected to the communication interface, and at least one memory electrically connected to the processor. According to an embodiment, the memory stores instructions that, when executed, cause the processor to receive a request for information about a session of the voice-based intelligent assistance service through the communication interface from an electronic device (e.g., electronic device 220) including a user interface, a speaker, and a microphone, and to confirm the session information of the voice-based intelligent assistance service, and to transmit information related to a selected session to the electronic device if the voice-based intelligent assistance service is being provided in the selected session.

According to various embodiments, the instructions store instructions for causing the processor to receive utterance data from the electronic device in the selected session and to transmit the received utterance data to a control device through the session.

According to various embodiments, the utterance data includes data for which the control device is not specified.

According to various embodiments, the instructions store instructions for causing the processor to receive utterance data in the selected session from the electronic device and to process the utterance data in the selected session using a natural language understanding module.

According to various embodiments, the instructions store instructions for causing the processor to process the utterance data using another natural language understanding module when the processing reliability of the utterance data is out of a predetermined range.

According to various embodiments, the information related to the selected session includes at least one of information on a control device to process utterance data, a session maintenance time, and information related to an operation state of the control device.

Figure 4:
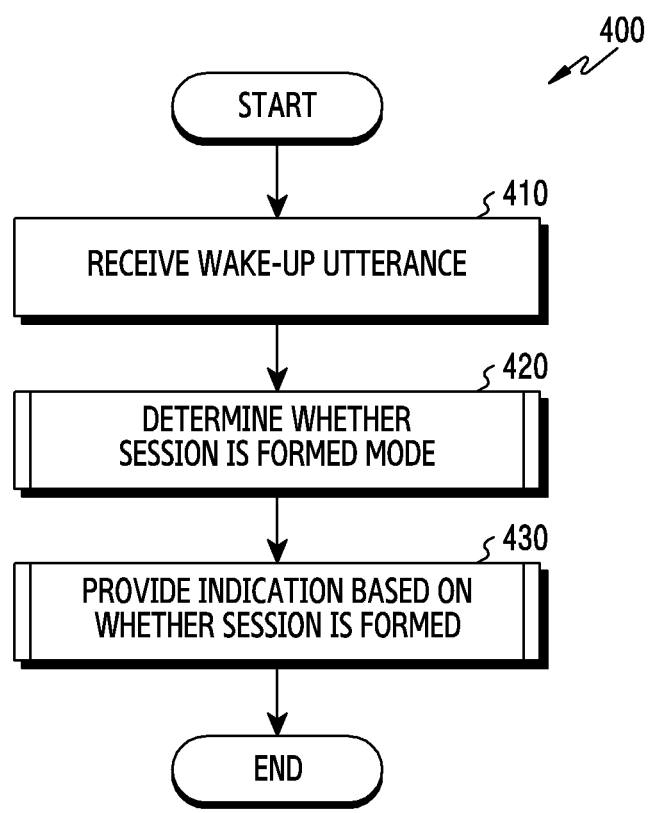
FIG. 4 is a flowchart for providing session formation information in an electronic device according to various embodiments of the present disclosure.
Figure 5:
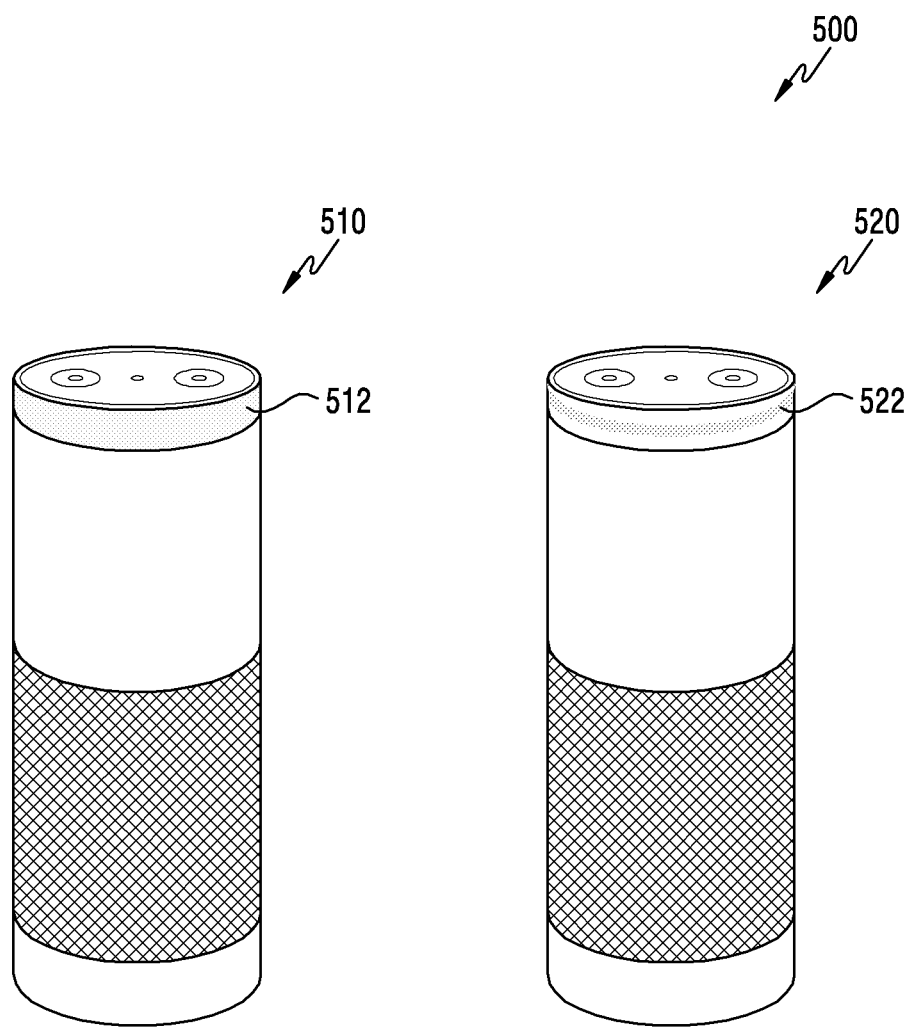
FIG. 5 is a diagram for describing a situation in which an indication is provided according to various embodiments.

FIG. 4 is a flowchart 400 for providing session formation information in an electronic device according to various embodiments of the present disclosure. FIG. 5 is a diagram illustrating a situation 500 in which an indication is provided according to various embodiments. In the following embodiments, each of the operations is sequentially performed, but not necessarily sequentially. For example, the order of each operation may be changed, and at least two operations may be performed in parallel. The electronic device of FIG. 4 may be the electronic device 101 and/or the electronic device 220 of FIG. 1 and/or FIG. 2.

Referring to FIG. 4, according to various embodiments, an electronic device (e.g., the processor 120 of FIG. 1) receives a wake-up utterance in operation 410. The wake-up utterance is received in a situation in which the electronic device operates in a low power mode. In a situation of operating in the low power mode, a first processor (e.g., the coprocessor 123 in FIG. 1) for receiving a wake-up utterance is activated, and a second processor (e.g., the main processor 121 in FIG. 1) for controlling the intelligent assistance service is deactivated. For example, the first processor (e.g., the coprocessor 123) consumes less power than the second processor (e.g., the main processor 121). However, this is only exemplary, and the present disclosure is not limited thereto. The first processor and the second processor may be implemented by one processor.

According to various embodiments, in operation 420, the electronic device (e.g., the processor 120) determines whether a session is formed in response to a wake-up utterance. Session formation means that at least one control device among a plurality of control devices is designated as a target control device to be controlled. According to an embodiment, session formation is maintained for a specified period of time after a control utterance instructing an operation of a hardware/software configuration included in the control device is received. For example, when the processor 120 receives a subsequent utterance (e.g., control utterance and/or wake-up utterance) within a specified period of time after receiving a control utterance instructing the operation of a hardware/software configuration included in the control device, it is confirmed that the session has already been established.

Whether a session is formed is confirmed by the second processor (e.g., the main processor 121 in FIG. 1). The second processor (e.g., the main processor 121) is wake-up in response to detecting the wake-up utterance by the first processor (e.g., the coprocessor 123).

According to various embodiments, in operation 430, the electronic device (e.g., the processor 120) provides an indication based on whether a session is formed. According to an embodiment, when a wake-up utterance is received while a session is not formed, the processor 120 performs a first operation. The processor 120 provides a first indication indicating that the formed session does not exist through the first operation. According to another embodiment, the processor 120 performs the second operation when a wake-up utterance is received while a session is formed. The processor 120 provides a second indication that the formed session exists through the second operation. According to an embodiment, the processor 120 provides the first indication and the second indication using at least one of a color, a sound, a vibration, or an image. For example, as shown in FIG. 5, the processor 120 provides a first indication 510 by controlling the light emitting unit to emit light in a first color (e.g., blue) 512, and provides a second indication 520 by controlling the light emitting unit to emit light in a second color (e.g., red) 522. However, this is only exemplary, and the present disclosure is not limited thereto. For example, the processor 120 provides an indication indicating the existence of a session formed using a light emission pattern, a brightness, or a combination thereof. As another example, the processor 120 provides the first indication and the second indication by using different types of sounds (or vibrations) and sounds (or vibrations) having different intensities. As another example, the processor 120 provides the first indication and the second indication by using different types of images and images having different sizes. In addition, when providing the second indication, the processor 120 provides additionally information related to the target control device forming a session with the electronic device. For example, the light emission pattern or light emission brightness of the second indication is adjusted according to the type of the target control device forming the session.

In the above-described embodiment, the command for activating or calling the intelligent assistance service has been described as wake-up utterance. However, this is only exemplary, and embodiments of the present disclosure are not limited thereto. For example, an input of a physical hard key such as a button type key (e.g., power key, volume key, home key, etc.) or a soft key such as a touch key (e.g., menu key, cancel key, etc.), etc. in the electronic device 101 and a specific motion detected through a pressure sensor or a motion sensor, are used as a command to activate or call an intelligent assistance service.

Figure 6:
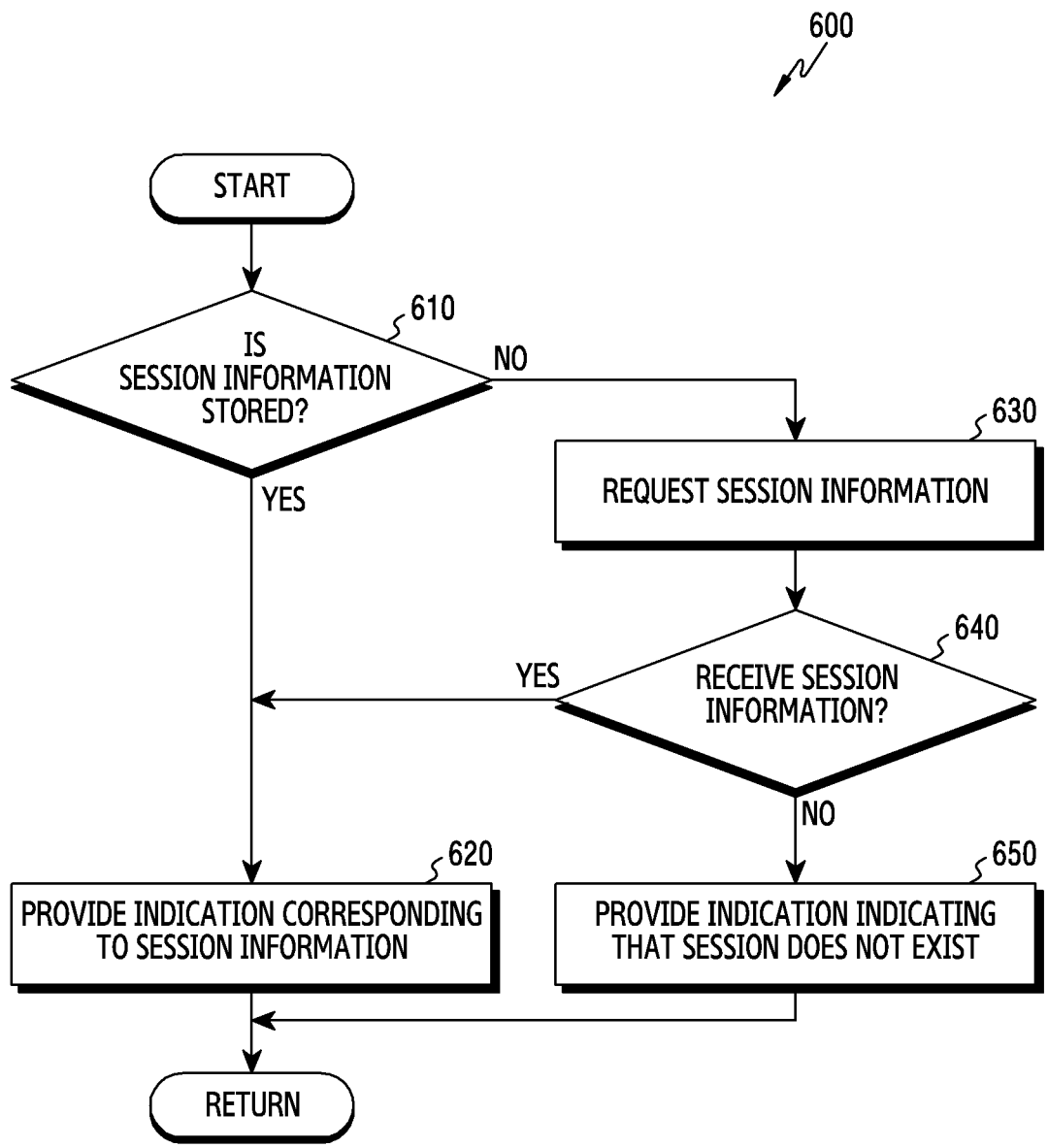
FIG. 6 is a flowchart for providing an indication corresponding to the existence of a session formed in an electronic device according to various embodiments of the present disclosure.

FIG. 6 is a flowchart 600 for providing an indication corresponding to the existence of a session formed in an electronic device according to various embodiments of the present disclosure. The operations of FIG. 6 to be described below illustrate various embodiments of operations 420 and 430 of FIG. 4. In the following embodiments, each of the operations is sequentially performed, but not necessarily sequentially. For example, the order of each operation may be changed, and at least two operations may be performed in parallel. The electronic device of FIG. 6 may be the electronic device 101 and/or the electronic device 220 of FIG. 1 and/or FIG. 2.

Referring to FIG. 6, an electronic device (e.g., the processor 120 in FIG. 1) according to various embodiments determines whether session information is stored in response to receiving an utterance in operation 610. Session information is information indicating that a target control device designated as a control target exists for a specified period of time, and includes information on a device (e.g., an electronic device) receiving an utterance and information on a target control device that has processed a control message and a session maintenance time (e.g., a period of time designated as a target control device). This is only exemplary, and embodiments of the present disclosure are not limited thereto. For example, the session information includes various information such as identification information of a speaker (utterance speaker) who has formed a session and an operation state (e.g., on/off state) of the target control device.

According to various embodiments, when it is determined that the session information is stored in an electronic device (e.g., memory 130), the electronic device (e.g., processor 120) performs the second operation in operation 620. The processor 120 obtains session information through the second operation and provides an indication (e.g., a second indication) corresponding to the obtained session information. According to an embodiment, the processor 120 provides various indications corresponding to session information, as shown in Table 1 below.

TABLE 1

| whether the session exists (first information) | target device (second information) | how to provide indication |
| --- | --- | --- |
| exists | — | second color glow |
| exists | television | second color glow + third color glow |

For example, when session information including only the first information indicating the existence of the formed session is obtained, the processor 120 provides an indication by emitting the light emitting unit in a designated second color (e.g., red). In addition, when session information including first information, and second information related to a target control device (e.g., a television) forming a session with the electronic device is obtained, the processor 120 provides an indication by emitting the light emitting unit in a second color (e.g., red) and a third color (e.g., green) sequentially.

According to various embodiments, when it is determined that the session information is not stored in the electronic device, the electronic device (e.g., the processor 120) requests the session information from the server or another electronic device in operation 630. According to an embodiment, in operation 640, the electronic device (e.g., the processor 120) determines whether session information is received from a server or another electronic device. For example, the processor 120 exists in a standby state for receiving session information for a predetermined period of time.

According to various embodiments, when receiving the session information is confirmed, the electronic device (e.g., the processor 120) provides an indication corresponding to the obtained session information in operation 620.

According to various embodiments, if receiving the session information is not confirmed, the electronic device (for example, the processor 120) performs the first operation in operation 650 as determining that the session information does not exist in the electronic device and the server. The processor 120 provides an indication (e.g., a first indication) indicating that a session does not exist through the first operation. According to an embodiment, the processor 120 provides an indication that emits a first color (e.g., blue).

According to various embodiments, the electronic device (e.g., the processor 120) omits at least one of the operations 610 to 650 in FIG. 6. For example, if it is determined that the processor 120 omits the operation 630 and operation 640 and the session information is not stored in the electronic device, the processor 120 performs the first operation.

Figure 7:
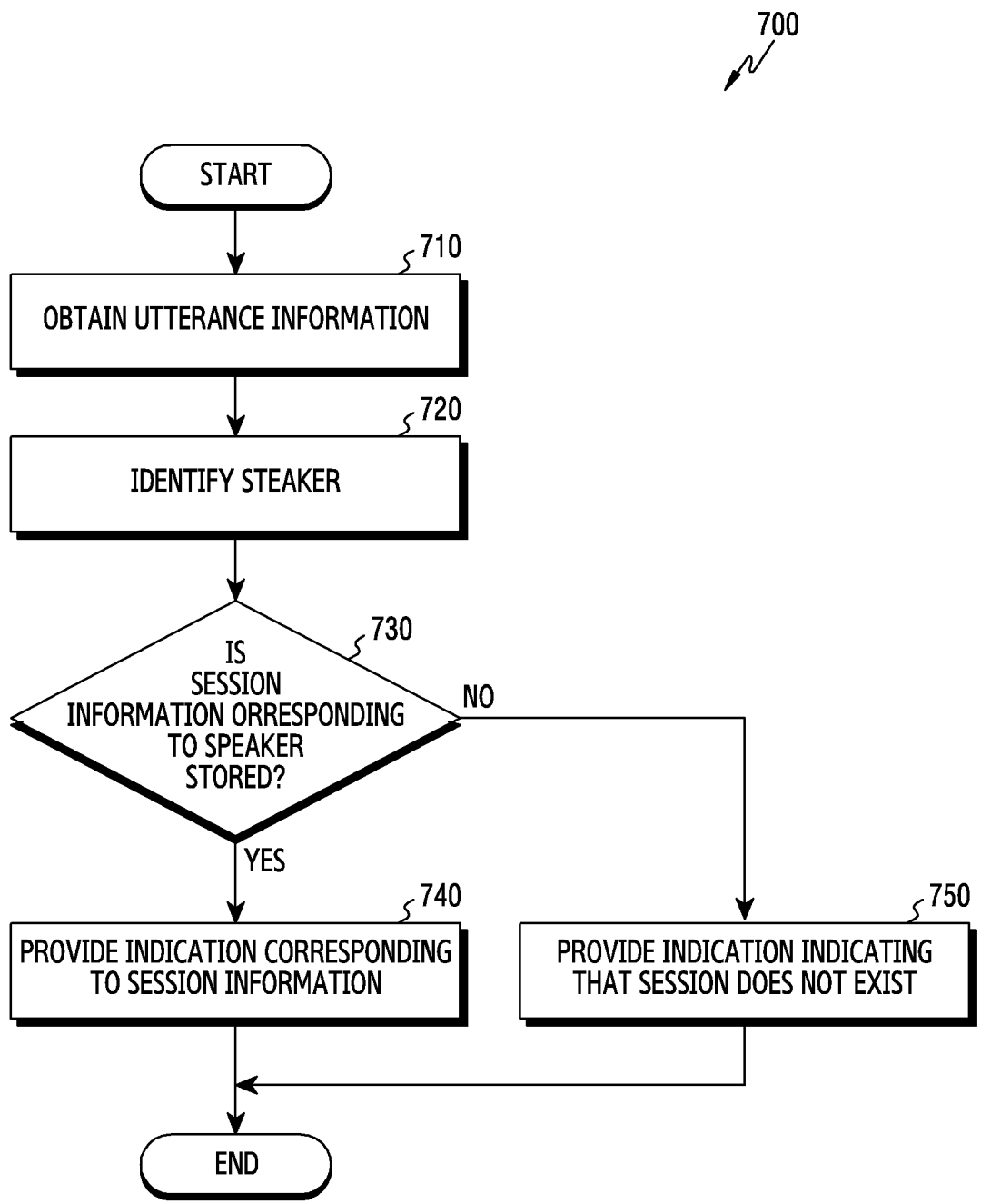
FIG. 7 is another flowchart for providing an indication corresponding to the existence of a session formed in an electronic device according to various embodiments of the present disclosure.

FIG. 7 is another flowchart 700 for providing an indication corresponding to the existence of a session formed in an electronic device according to various embodiments of the present disclosure. The operations of FIG. 7 to be described below illustrate various embodiments of operations 420 and 430 of FIG. 4. In the following embodiments, each of the operations may be sequentially performed, but not necessarily sequentially. For example, the order of each operation may be changed, and at least two operations may be performed in parallel. The electronic device of FIG. 7 may be the electronic device 101 in FIG. 1 and/or the electronic device 220 in FIG. 2.

Referring to FIG. 7, an electronic device (e.g., the processor 120 in FIG. 1) according to various embodiments obtains utterance information in operation 710. The utterance information includes various pieces of information for generating voiceprint data used to identify a speaker. For example, a tone, a speed (tempo), a volume, and an intonation of the utterance are obtained as utterance information. The types of utterance information are exemplary only, and embodiments of the present disclosure are not limited thereto. For example, the processor 120 acquires, as utterance information, various pieces of information for distinguishing utterance habits, such as pronunciation.

In operation 720, the electronic device (e.g., the processor 120) according to various embodiments identifies a speaker based on the acquired utterance information. For example, the processor 120 generates voiceprint data based on the acquired utterance information, and identifies the user corresponding to the generated voiceprint data among users registered in the electronic device through a predetermined registration operation (e.g., account registration) as the speaker.

In operation 730, the electronic device (e.g., the processor 120) according to various embodiments determines whether session information corresponding to the speaker is stored.

According to various embodiments, when it is confirmed that session information corresponding to a speaker is stored, the electronic device (e.g., the processor 120) performs the second operation in operation 740. The processor 120 provides an indication (e.g., a second indication) corresponding to the session information through the second operation. According to an embodiment, the processor 120 provides various indications corresponding to session information, as shown in Table 2 below.

TABLE 2

| speaker | how to provide indication |
|---|---|
| speaker A | glow of second color |
| speaker B | glow of third color |

For example, when session information for speaker A is obtained, the processor 120 provides an indication by operating the light emitting unit in a designated second color (e.g., red). In addition, when session information for speaker B is obtained, the processor 120 provides an indication by operating the light emitting unit in a designated third color (e.g., green).

According to various embodiments, if storage of session information corresponding to a speaker is not confirmed, the electronic device (e.g., the processor 120) performs the first operation in operation 750. The processor 120 provides an indication (e.g., a first indication) indicating that a session does not exist through the first operation. For example, the processor 120 provides an indication by emitting a first color (e.g., blue). According to another embodiment, when there is no session information corresponding to the speaker, the processor 120 identifies a control device that is relatively likely to be controlled by the identified speaker based on the session history formed by the speaker in the past. In this case, the processor 120 provides an indication corresponding to the identified control device.

According to various embodiments, the electronic device (e.g., the processor 120) additionally performs an operation other than operations 710 to 750 in FIG. 7. For example, when it is not confirmed that the session information corresponding to the speaker is stored, the processor 120 provides a request for session information corresponding to the speaker to a server or another electronic device. Also, the processor 120 performs the first operation or the second operation based on whether or not to receive session information from the server or another electronic device.

Figure 8:
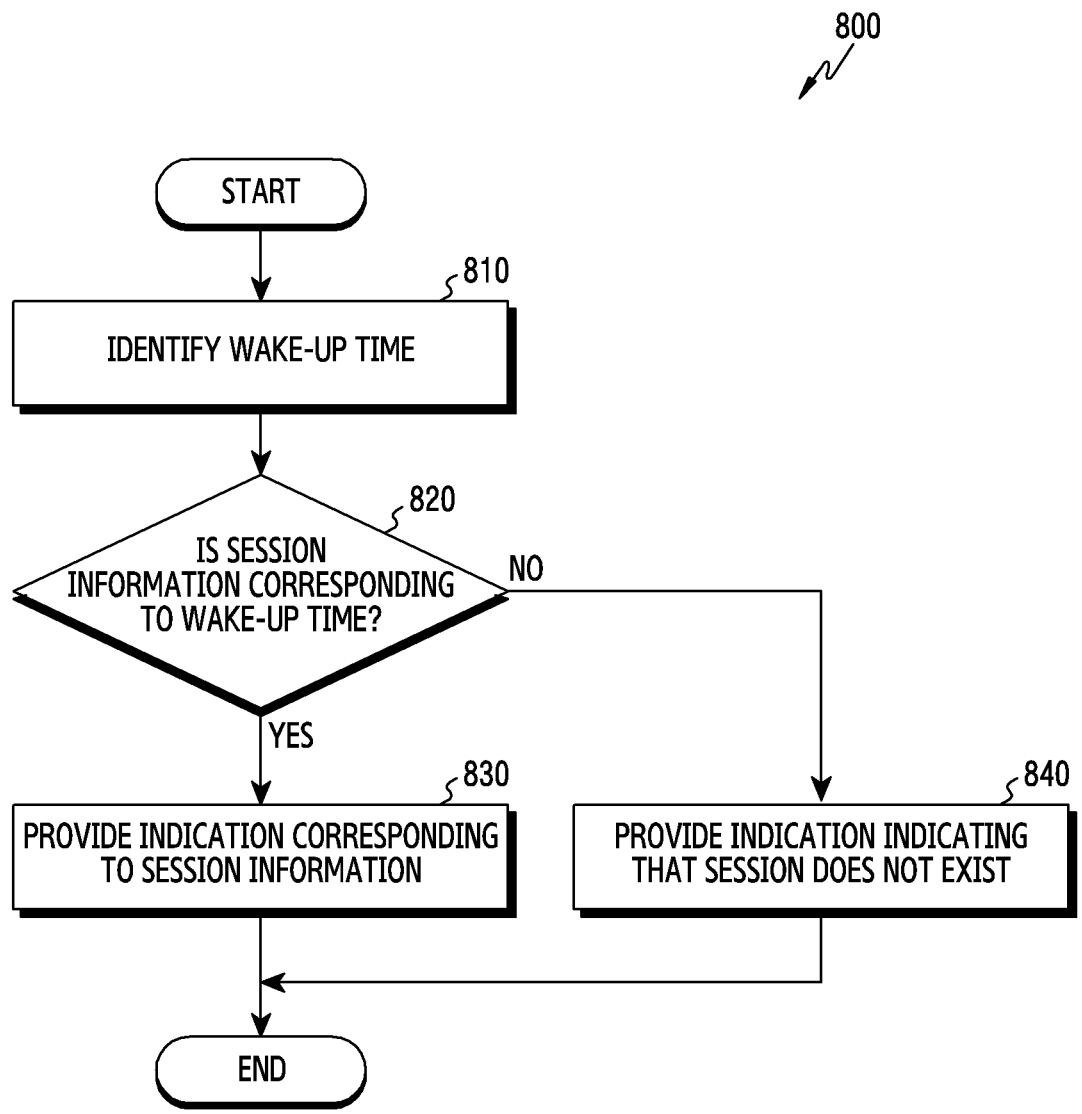
FIG. 8 is another flowchart for providing an indication corresponding to the existence of a session formed in an electronic device according to various embodiments of the present disclosure.

FIG. 8 is another flowchart 800 for providing an indication corresponding to the existence of a session formed in an electronic device according to various embodiments of the present disclosure. The operations of FIG. 8 described below illustrate various embodiments of operations 420 and 430 of FIG. 4. In the following embodiments, each of the operations is sequentially performed, but not necessarily sequentially. For example, the order of each operation may be changed, and at least two operations may be performed in parallel. The electronic device of FIG. 8 may be the electronic device 101 and/or the electronic device 220 of FIGS. 1 and/or 2.

Referring to FIG. 8, an electronic device (e.g., the processor 120 of FIG. 1) according to various embodiments checks a wake-up time in operation 810. The wake-up time is associated with an activation time or a call time of the voice-based intelligent assistance service. According to an embodiment, the processor 120 identifies the time at which the wake-up utterance is detected as the wake-up time.

According to various embodiments, in operation 820, the electronic device (e.g., the processor 120) determines whether the session information corresponding to the wake-up time is stored.

According to various embodiments, when it is confirmed that the session information corresponding to the wake-up time is stored, the electronic device (e.g., the processor 120) performs the second operation in operation 830. The processor 120 provides an indication (e.g., a second indication) corresponding to the session information through the second operation. According to an embodiment, the processor 120 provides various indications corresponding to the session information, as shown in Table 3 below.

TABLE 3

| wake-up time | how to provide indication |
|---|---|
| before noon | glow of second color |
| afternoon | glow of third color |

For example, when the session information corresponding to a first time zone (e.g., before noon) is obtained, the processor 120 provides an indication by emitting the light emitting unit in a designated second color (e.g., red). In addition, when the session information corresponding to the second time zone (e.g., afternoon) is obtained, the processor 120 provides an indication by emitting the light emitting unit in a designated third color (e.g., green).

According to various embodiments, if it is not confirmed that the session information corresponding to a speaker is stored, the electronic device (e.g., the processor 120) performs the first operation in operation 840. The processor 120 provides an indication (e.g., a first indication) indicating that a session does not exist through the first operation. For example, the processor 120 provides an indication by emitting a first color (e.g., blue). According to another embodiment, when there is no session information corresponding to the wake-up time, the processor 120 identifies a control device that is relatively large possibility of being controlled by the speaker in the current time zone based on time information in which the session was formed in the past. In this case, the processor 120 provides an indication corresponding to the identified control device.

Figure 9:
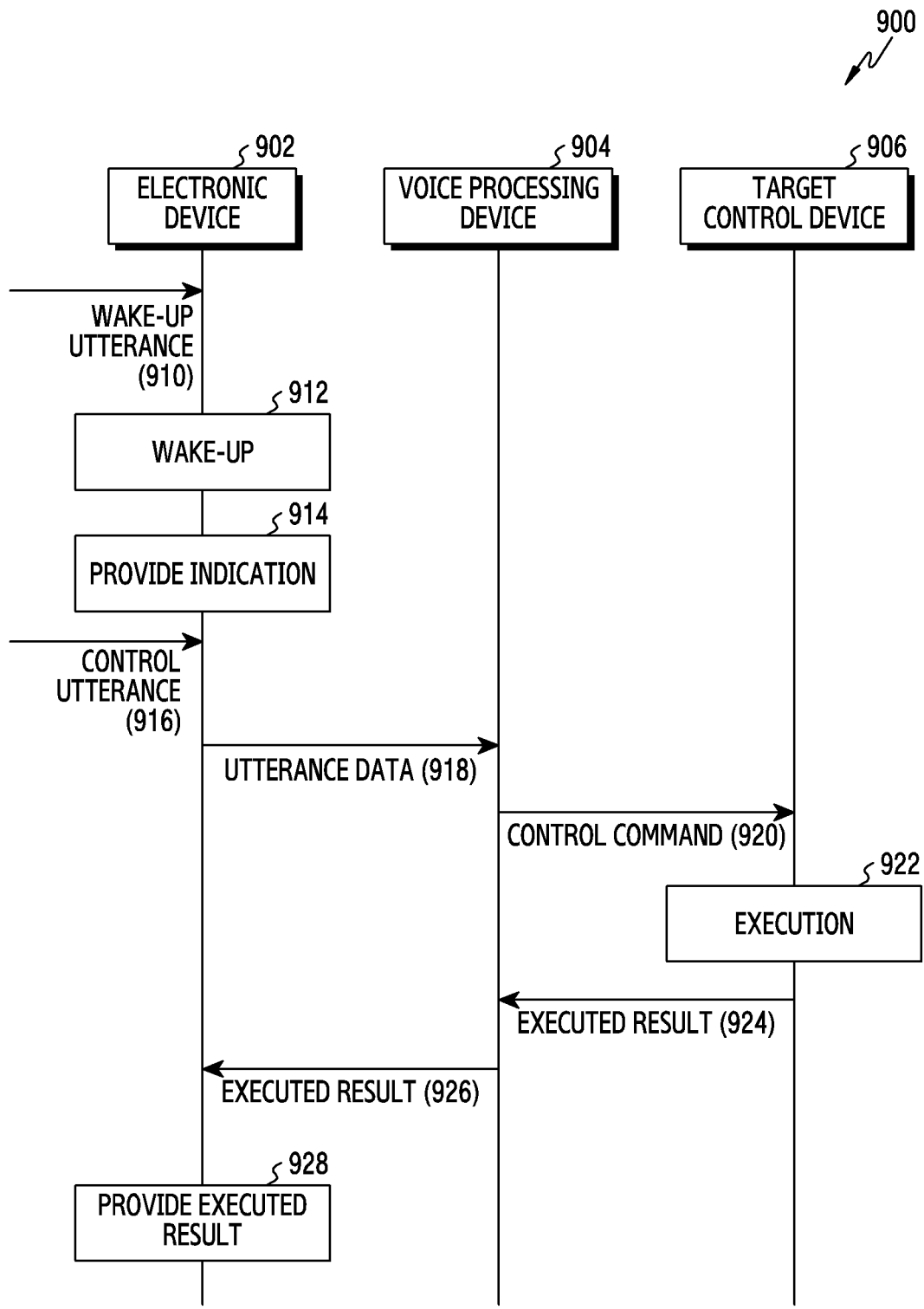
FIG. 9 is a diagram illustrating an operation of processing an utterance in a system according to various embodiments.

FIG. 9 is a diagram illustrating an operation 900 of processing an utterance in a system according to various embodiments.

As shown in FIG. 9, the system according to various embodiments includes an electronic device 902, a voice processing device 904, and a target control device 906, and the voice processing device 904 corresponds to the server 230 shown in FIG. 2 and FIG. 3.

Referring to FIG. 9, in operation 910, the electronic device 902 receives a wake-up utterance uttered by a user. According to an embodiment, the electronic device 902 receives a wake-up utterance while operating in a low power mode. In a situation of operating in the low power mode, a first processor (e.g., the coprocessor 123 in FIG. 1) for receiving the wake-up utterance is activated, and a second processor (e.g., the main processor 121 in FIG. 1) for controlling the intelligent assistance service is deactivated. For example, the wake-up utterance is received through the first processor.

In operation 912, the electronic device 902 wakes up based on the wake-up utterance. Wake-up includes activating the second processor which is in an inactive state. According to an embodiment, the voice processing device 904 and/or the target control device 906 also wakes up based on the wake-up utterance. In this case, the electronic device 902, the voice processing device 904, and the target control device 906 wake up sequentially or in parallel, at the same time, within a predetermined time range at the time of recognizing the voice call command.

In operation 914, the electronic device 902 provides an indication indicating whether a formed session exists or not based on the wake-up. The indication indicates whether a control device (e.g., a target control device) designated to perform an operation corresponding to the control utterance among the plurality of control devices 906 existing around the electronic device 902 is present or not. According to an embodiment, the electronic device 902 provides an indication until a user's control utterance instructing the target control device 906 to provide a service is detected. Accordingly, the user intuitively identifies information on the control device capable of processing the control utterance through the indication provided by the electronic device 902.

In operation 916, the electronic device 902 receives a control utterance for controlling the target control device 906. According to an embodiment, the electronic device 902 converts the received control utterance into an electrical signal.

In operation 918, the electronic device 902 transmits utterance data for the control utterance to the voice processing device. Also, utterance data is pre-processed and transmitted for more accurate utterance recognition.

In operation 920, the voice processing device 904 generates a control message based on the utterance data received from the electronic device 902 and transmits the generated control message to the target control device 906. According to an embodiment, the voice processing device 904 analyzes the utterance data received from the electronic device 902 to determine the target control device 906 to process the control utterance among a plurality of control devices locating in the vicinity. The control message is generated based on the analysis result of the utterance data. Analysis of utterance data is performed through natural language processing.

In operation 922, the target control device 906 executes a control operation corresponding to the control utterance, based on the control message received from the voice processing device, and generates a feedback including a result of the execution (e.g., processing result). The feedback is provided to the electronic device 902 by the target control device 906 and the voice processing device 904 through operations 924 and 926.

In operation 928, the electronic device 902 provides a result of processing the control utterance based on the received feedback. The processing result is provided using at least one of a color (e.g., emission color), a sound, a vibration, or an image. Although not shown, in addition to providing the processing result of the electronic device 902, the target control device 906 also provides the processing result for the control utterance.

Figure 10:
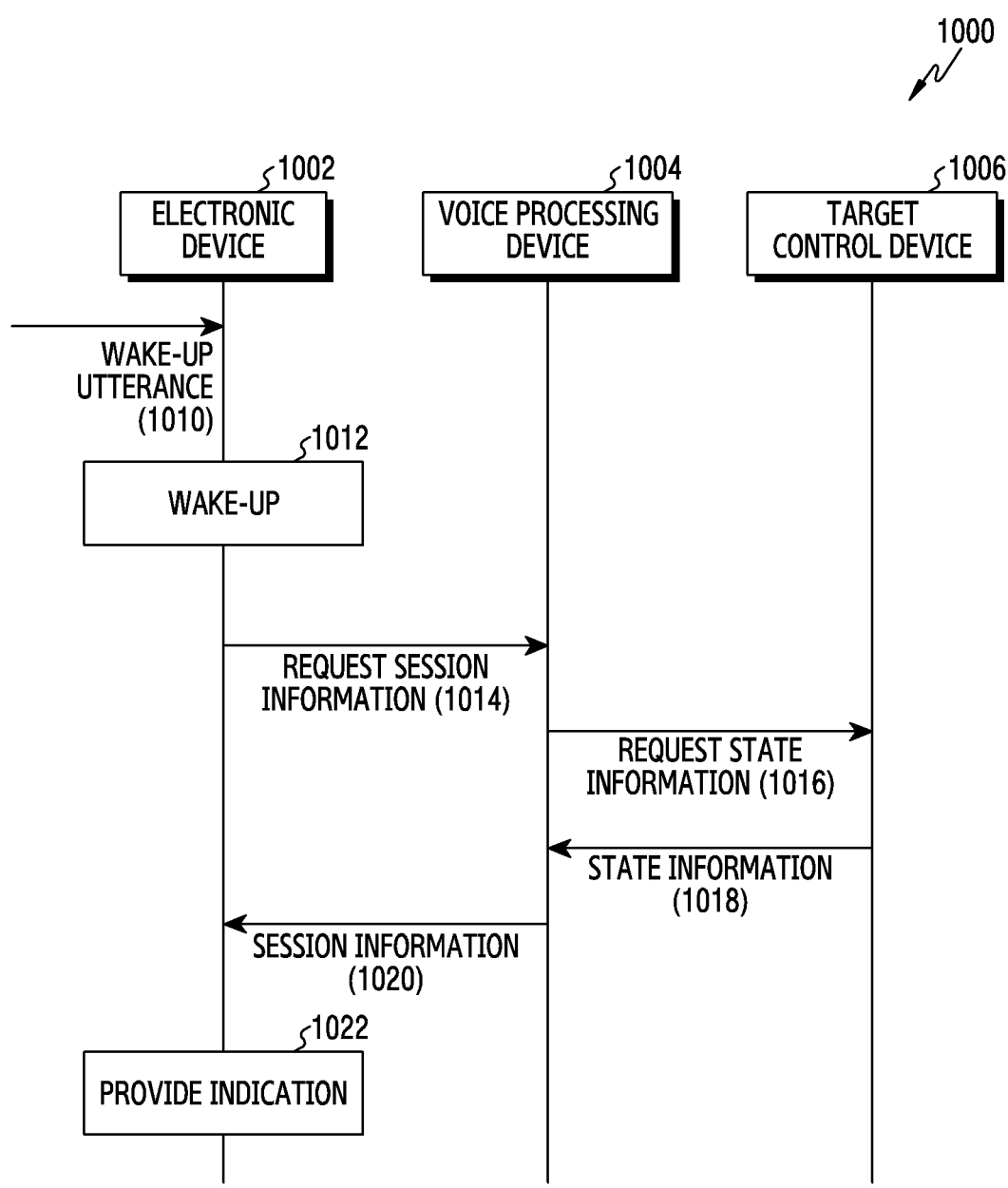
FIG. 10 is a diagram illustrating an operation of providing an indication in a system according to various embodiments.

FIG. 10 is a diagram illustrating an operation 1000 of providing an indication in a system according to various embodiments.

As shown in FIG. 10, the system according to various embodiments includes an electronic device 1002, a voice processing device 1004, and a target control device 1006. The voice processing device 1004 corresponds to the server shown in FIG. 2 and FIG. 3.

Referring to FIG. 10, in operation 1010 and operation 1012, the electronic device 1002 operates in a wake-up state in response to receiving a wake-up utterance. For example, the electronic device 1002 performs the same or similar operations as operation 910 and operation 912 in FIG. 9.

In operation 1014, the electronic device 1002 provides a request for session information to the voice processing device 1004. The session information includes information on the target control device 1006 designated to perform an operation corresponding to the control utterance. As described above with reference to FIG. 3, the session information includes information on a device (e.g., an electronic device) 1002 receiving a control utterance, information on a target control device 1006 that processed a control message, and information on a session maintenance time (time interval designated as the target control device). Additionally, the voice processing device 1004 adds information related to an operation state (e.g., an on/off state) of the target control device 1006 to the session information. In order to generate the session information, in operation 1016, the voice processing device 1004 provides a request for state information to the target control device 1006. In addition, in operation 1018, in response to the request for state information, the target control device 1006 checks its own state and provides information about the state of the target control device 1006 to the voice processing device 1004.

In operation 1020, the voice processing device 1004 receiving the state information from the target control device 1006 generates session information corresponding to the target control device 1006, and provides the generated session information to the electronic device 1002.

In operation 1022, the electronic device 1002 provides an indication indicating the existence of a formed session based on the session information received from the voice processing device 1004.

Figure 11:
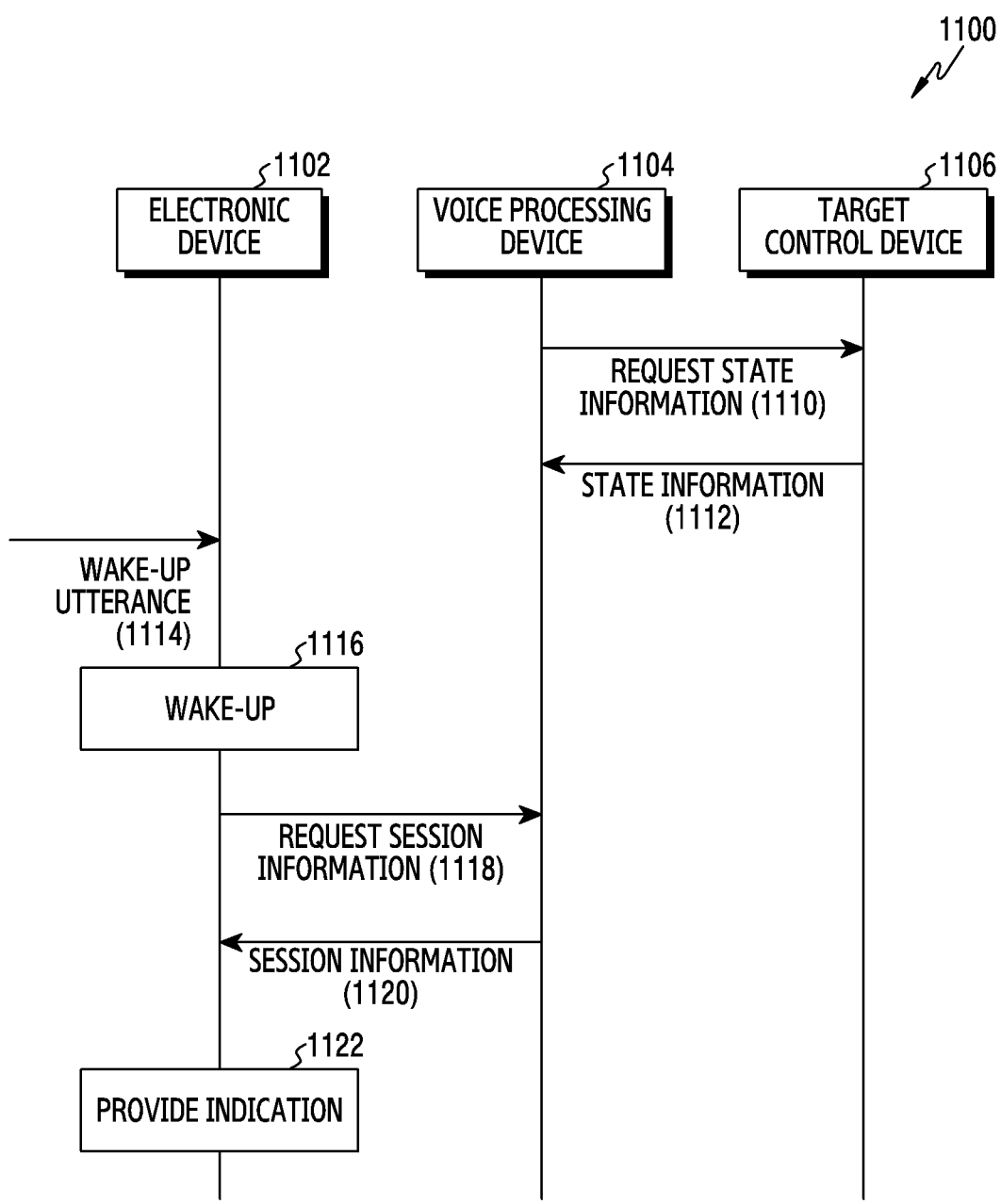
FIG. 11 is a diagram illustrating another operation of providing an indication in a system according to various embodiments.

FIG. 11 is a diagram illustrating another operation 1100 of providing an indication in the system according to various embodiments.

Referring to FIG. 11, a system according to various embodiments is configured similarly to the system providing the indication described above with reference to FIG. 10.

However, the method of providing an indication to be described with reference to FIG. 11 is different from the method of providing the indication in FIG. 10 in that the voice processing device generates session information before receiving the request for session information of the electronic device 1102.

Referring to FIG. 11, in operation 1110 and operation 1112, the voice processing device 1104 obtains state information of the target control device 1106 and generates session information based on the obtained state information. The session information is generated by the voice processing device 1104 at regular intervals regardless of the request of the electronic device 1102. For example, the voice processing device 1104 generates session information corresponding to the target control device 1106 by performing the same or similar operation as operation 1016 and operation 1018 in FIG. 10.

In operation 1114 and operation 1116, the electronic device 1102 operates in a wake-up state in response to receiving the wake-up utterance. For example, the electronic device 1102 performs the same or similar operations as operation 1010 and operation 1012 in FIG. 10.

In operation 1018 to operation 1122, the electronic device 1102 provides a request for session information to the voice processing device 1104, and provides an indication indicating the existence of a session formed based on the session information received from the voice processing device 1104. For example, the electronic device 1102 performs the same or similar operations as operation 1014, operation 1020, and operation 1022 in FIG. 10.

The method of providing the indication described with reference to FIG. 11 has an advantage in that the electronic device 1102 more quickly obtains session information as compared to the above-described method of providing the indication in FIG. 10.

Figure 12:
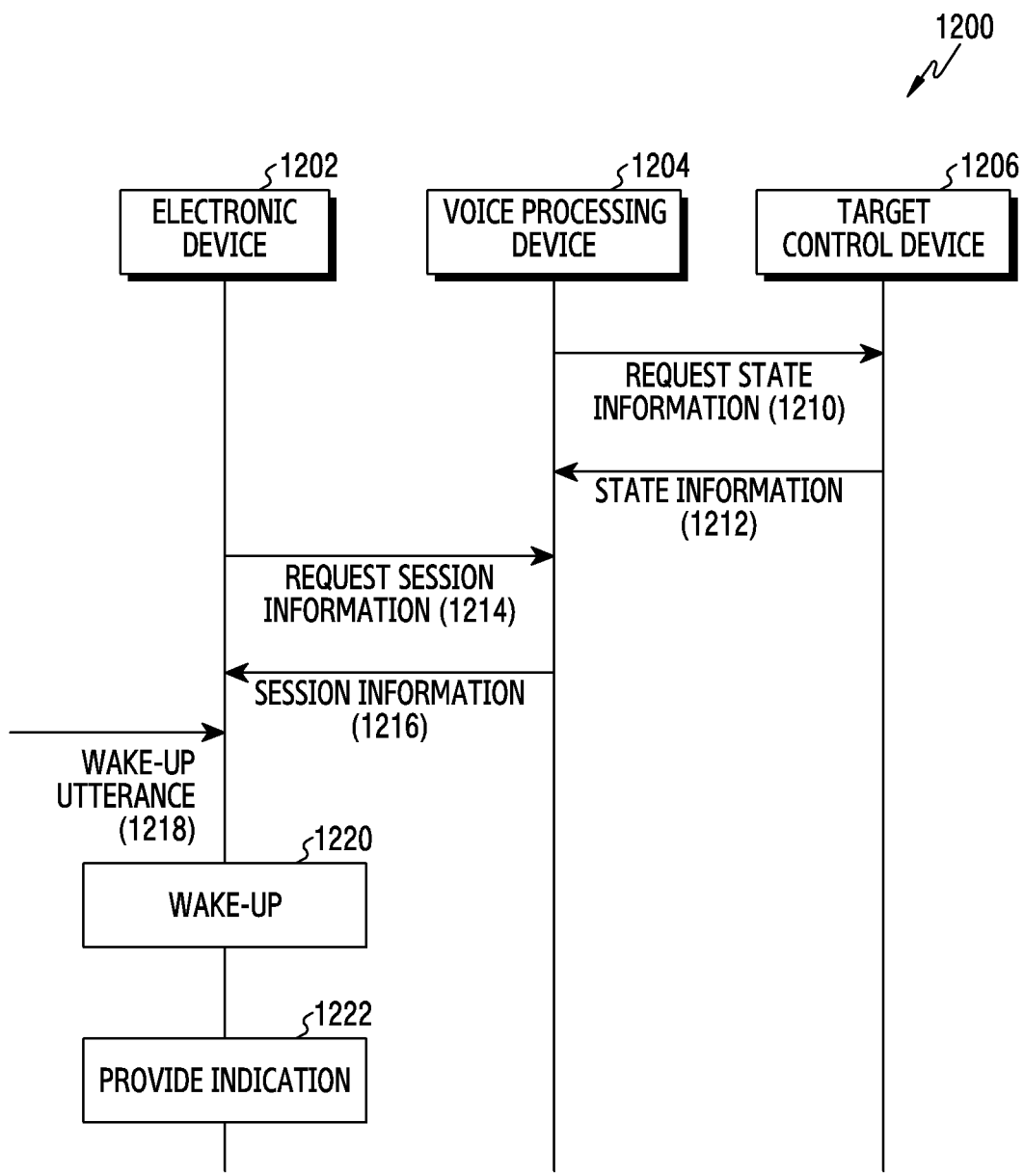
FIG. 12 is a diagram illustrating yet another operation of providing an indication in a system according to various embodiments.

FIG. 12 is a diagram illustrating another operation 1200 of providing an indication in a system according to various embodiments.

Referring to FIG. 12, a system according to various embodiments is configured similarly to the system providing the indication described above with reference to FIG. 11.

However, the method of providing an indication described with reference to FIG. 12 is different from the method of providing the indication in FIG. 11 in that the electronic device 1202 stores session information in advance before detecting a wake-up utterance.

Referring to FIG. 12, in operation 1210 and operation 1212, the voice processing device 1204 obtains state information of the target control device 1206 and generates session information. The session information is generated by the voice processing device 1204 at regular intervals regardless of the request of the electronic device 1202. For example, the voice processing device 1204 generates session information corresponding to the target control device by performing the same or similar operation as the operations 1110 and 1112 in FIG. 11.

In operation 1214 to operation 1216, the electronic device 1202 provides a request session information to the voice processing device 1204 and receives session information from the voice processing device 1204. For example, the electronic device 1202 performs the same or similar operations as operations 1118 and 1120 in FIG. 11.

In operation 1218 and operation 1220, the electronic device 1202 operates in a wake-up state in response to receiving the wake-up utterance. For example, the electronic device 1202 performs the same or similar operations as operations 1118 and 1120 in FIG. 11.

In operation 1222, in response to the wake-up utterance, the electronic device 1202 provides an indication indicating the existence of a session based on the stored session information. For example, the electronic device 1202 performs an operation identical to or similar to operation 1122 in FIG. 11.

The indication providing method described with reference to FIG. 12 has an advantage in that the electronic device 1202 more quickly provides indication information compared to the above-described method of providing the indication of FIG. 11.

Figure 13:
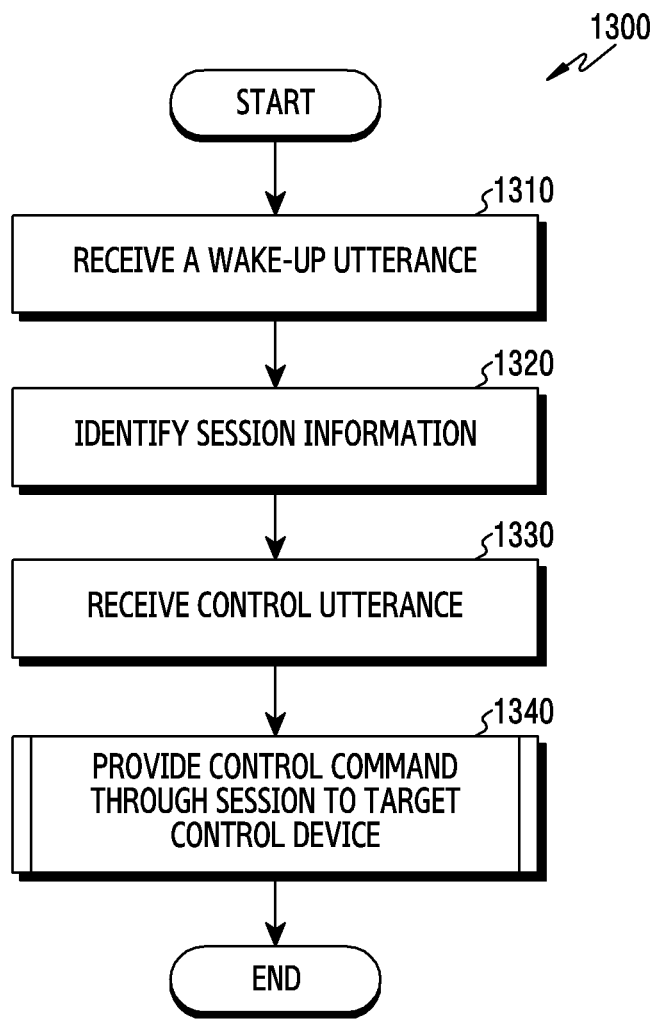
FIG. 13 is a flowchart for processing a control utterance in an electronic device according to various embodiments of the present disclosure.

FIG. 13 is a flowchart 1300 for processing a control utterance in an electronic device according to various embodiments of the present disclosure. In the following embodiments, each of the operations is sequentially performed, but not necessarily sequentially. For example, the order of each operation may be changed. Also, at least two operations may be performed in parallel. For example, the electronic device in FIG. 13 may be the electronic device 101 and/or the electronic device 220 in FIG. 1 and/or FIG. 2.

Referring to FIG. 13, according to various embodiments, an electronic device (e.g., the processor 120 in FIG. 1) receives a wake-up utterance in operation 1310. The wake-up utterance is an utterance indicating activation or calling of an intelligent assistance service. According to an embodiment, the processor 120 receives a wake-up utterance based on a first processor (e.g., the auxiliary processor 123 in FIG. 1) for recognizing the wake-up utterance.

According to various embodiments, in operation 1320, the electronic device (e.g., the processor 120), in response to a wake-up utterance, determines whether a session is formed. Session formation means that at least one control device among a plurality of control devices is designated as a target control device to be controlled. Whether or not a session is formed is confirmed by a second processor (e.g., the main processor 121 in FIG. 1) that controls the intelligent assistance service. The second processor (e.g., the main processor 121) wakes up in response to detecting the wake-up utterance by the first processor (e.g., the sub-processor 123). The first processor (e.g., the auxiliary processor 123) consumes less power than the second processor (e.g., the main processor 121).

According to various embodiments, the electronic device (e.g., the processor 120) receives a control utterance in operation 1330. The control utterance includes a control command instructing the target control device to provide a service.

According to various embodiments, the electronic device (e.g., the processor 120) transmits a control command to the target control device through a session in operation 1340. According to an embodiment, the processor 120 analyzes the control utterance to determine an intent and/or a domain for a user input, and generates a control command for controlling a control device based on the analysis result. In addition, the processor 120 determines the control device that processed the previous utterance as the target control device, and transmits the generated control command to the determined target control device.

Figure 14:
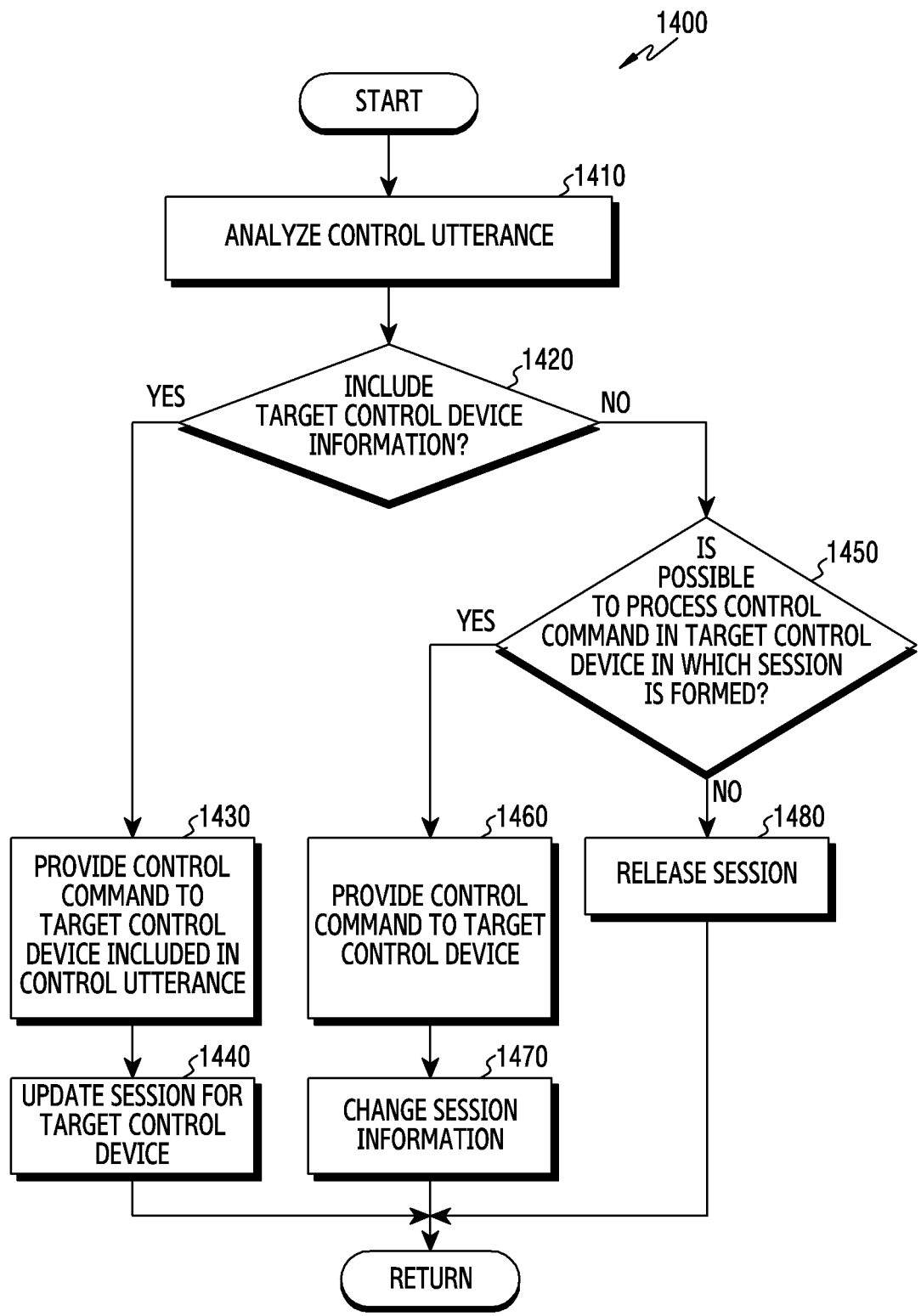
FIG. 14 is a flowchart for transmitting a control command in an electronic device according to various embodiments of the present disclosure.

FIG. 14 is a flowchart 1400 for transmitting a control command from an electronic device according to various embodiments. The operations in FIG. 14 to be described below represent various embodiments of the operation 1340 of FIG. 13.

In the following embodiments, each of the operations is sequentially performed, but not necessarily sequentially. For example, the order of each operation may be changed, and at least two operations may be performed in parallel. For example, the electronic device in FIG. 14 may be the electronic device 101 and/or the electronic device 220 in FIG. 1 and/or FIG. 2.

Referring to FIG. 14, according to various embodiments, an electronic device (e.g., the processor 120 in FIG. 1) analyzes a control utterance in operation 1410. The control utterance includes a control command instructing the control device to provide a service. Further, the control utterance includes information specifying the target control device or does not include information specifying the target control device. According to an embodiment, the processor 120 analyzes the control utterance using a voice recognition model and/or a natural language understanding model which are related to a target control device in which a session is formed among a plurality of voice recognition models. The voice recognition model and/or natural language understanding model related to the target control device is a model using a database for a domain, an intent, and/or a slot corresponding to the target control device.

According to various embodiments, the electronic device (e.g., the processor 120), in operation 1420, identifies whether information specifying the target control device is included in the control utterance.

According to various embodiments, when information specifying the target control device is included in the control utterance, the electronic device (e.g., the processor 120), in operation 1420, transmits a control command to the specified target control device through the control utterance. The target control device specified through the control utterance is or is not the same as the target control device that processed the previous utterance. According to various embodiments, the electronic device (for example, the processor 120), in operation 1440, updates a session for the target control device in response to providing a control command. Session update includes generating new session information for the target control device.

According to various embodiments, when information specifying the target control device is not included in the control utterance, the electronic device (for example, the processor 120) determines whether the processing of the control command in the target control device in which the session is formed is available in operation 1450. The availability of processing the control command is determined based on the session information.

According to various embodiments, when it is identified through session information that a target control device is in a state in which it is not possible to process a control command (e.g., power off), the electronic device (e.g., the processor 120) releases a pre-formed session in operation 1480. For example, the processor 120 outputs guide information for inducing the control utterance including information specifying the target control device, and receives a new control utterance from the user.

According to various embodiments, when it is identified through session information that a target control device is in state (e.g., power on) in which it is possible to process a control command, the electronic device (e.g., the processor 120) in operation 1460 provides the control command to the control device. For example, the processor 120 transmits a control command through a pre-formed session so that an utterance that does not include information on the target control device is processed by the control device that has processed the previous utterance. According to various embodiments, in operation 1470, the electronic device (e.g., the processor 120) changes session information on the target control device in response to providing the control command. Changing the session information includes extending a session maintenance time (e.g., a period of time designated as a target control device) included in the session information for a certain time.

Figure 15:
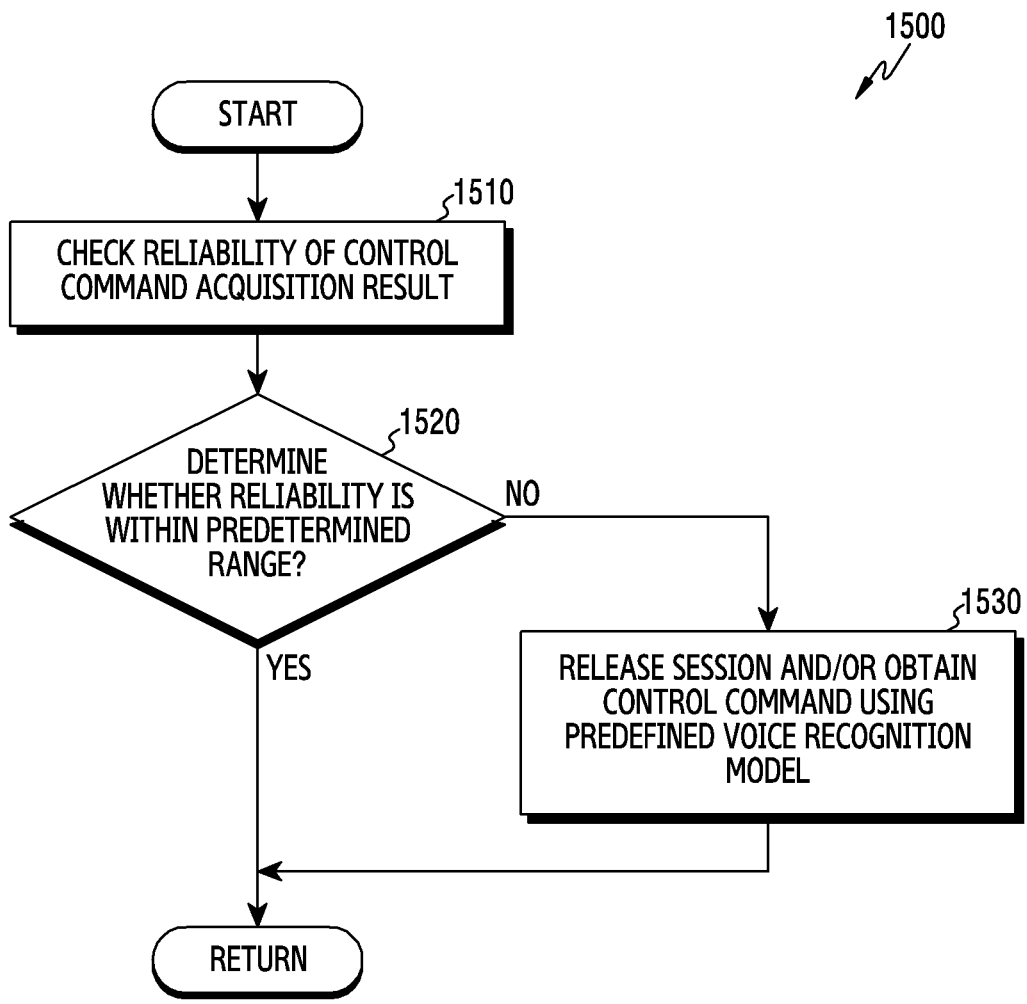
FIG. 15 is a flowchart for obtaining a control command in an electronic device according to various embodiments of the present disclosure.

FIG. 15 is a flowchart 1500 for obtaining a control command in an electronic device according to various embodiments of the present disclosure. The operations in FIG. 15 to be described below represent various embodiments of operation 1340 in FIG. 13. In the following embodiments, each of the operations is sequentially performed, but not necessarily sequentially. For example, the order of each operation may be changed, and at least two operations may be performed in parallel. Also, for example, the electronic device in FIG. 15 may be the electronic device 101 in FIG. 1.

Referring to FIG. 15, according to various embodiments, an electronic device (e.g., the processor 120 of FIG. 1) checks the reliability of a control command acquisition result in operation 1510. The control command is obtained through natural language processing on the control utterance. Reliability is calculated through feedback on the results of natural language processing. For example, the processor 120 provides a natural language processing result to the user, and if, in response to the processing result, an input indicating a processing error is detected (e.g., when a control utterance is input again), it is judged that the reliability is low.

According to various embodiments of the present disclosure, in operation 1520, the electronic device (processor 120) determines whether the identified reliability is not within a predetermined range. For example, if the control utterance is not input again, the processor 120 determines that the reliability of the control command acquisition result is within a predetermined range.

According to various embodiments, the electronic device (processor 120) transmits the obtained control command to the target control device when the identified reliability is within a predetermined range.

According to various embodiments of the present disclosure, when the verified reliability level is not within a predetermined range, in operation 1530, the electronic device (processor 120) releases the pre-formed session. For example, the processor 120 outputs guide information for inducing the control utterance including information specifying the target control device, and receives a new control utterance from the user. As another example, the processor 120 obtains a control command using a predefined voice recognition model and/or a predefined natural language understanding model. For example, the processor 120 uses, by changing, a voice recognition model and/or a natural language understanding model that uses more databases than a currently used voice recognition model and/or a currently used natural language understanding model in order to obtain a control command with higher reliability.

According to various embodiments of the present disclosure, a method for processing utterance by an electronic device (e.g., the electronic device 220) includes: receiving a wake-up utterance calling a voice-based intelligent assistance service; in response to the wake-up utterance, confirming a session processed by the voice-based intelligent assistance service; and in response to receiving a control command, providing the control command to an external control device through the session based on the session.

According to various embodiments, the providing of the control command includes: when the control command specifies a control device, forming a session with the specified control device; and providing the control command to the specified control device through the formed session. According to an embodiment, the providing of the control command to the specified control device includes generating information related to a session corresponding to the specified control device.

According to various embodiments, the providing of the control command includes providing the control command through an ongoing session when the control command does not specify a control device. According to an embodiment, the operation of providing the control command through the ongoing session includes an operation of updating information related to the ongoing session.

According to various embodiments, the providing of the control command through the ongoing session includes: checking an operation state of an external control device in which a session is ongoing; releasing the session when an operation state in which processing the control command is not possible is identified; and receiving a control command specifying the control device. According to an embodiment, the receiving of the control command specifying the control device includes providing guide information indicating an operation state in which processing the control command is not possible.

According to various embodiments of the present disclosure, a method for processing an utterance of an electronic device includes: activating a first processor to receive the wake-up utterance; and activating a second processor that consumes less power than the first processor in order to receive the control command.

Meanwhile, although various embodiments of the present disclosure have been described, various modifications may be made without departing from the scope of the various embodiments of the present disclosure. Therefore, the scope of the various embodiments of the present disclosure should not be limited to the above described embodiments but should be determined by the scope of the claims and also by equivalents of the scope of the claims to be described hereinafter.

The invention claimed is:

1. An electronic device, comprising:
a user interface;
at least one communication circuit;
at least one microphone;
at least one speaker;
at least one processor operatively coupled to the user interface, the at least one communication circuit, the at least one microphone, and the at least one speaker; and
at least one memory electrically coupled to the at least one processor,
wherein the at least one memory stores instructions that, when executed, cause the at least one processor to,
based on a first control command acquired by a voice-based intelligent assistance service and designating a first control device, form a first session related to the first control device, wherein the first session lasts for a designated time duration and is scheduled to be released after the designated time duration is over,
receive, through the at least one microphone, a wake-up utterance for calling the voice-based intelligent assistance service, and
in response to receiving the wake-up utterance after the designated time duration is over, provide a first indication indicating that the first session has been released, by using at least one of the user interface or the at least one speaker, and
in response to receiving the wake-up utterance before the designated time duration is over, provide a second indication indicating that the first session is ongoing, by using at least one of the user interface or the at least one speaker.

2. The electronic device of claim 1, wherein the at least one memory further stores an instruction that, when executed, cause the at least one processor to:
in response to receiving the wake-up utterance after the designated time duration is over, identify a first speak person related to a second session, based on characteristics of a voice of the wake-up utterance, and
provide a third indication indicating that the second session related to the first speak person is ongoing,
when a second control command related to the wake-up utterance does not designate a target to control, based on the second session, provide the second control command to a third control device.

3. The electronic device of claim 1, wherein the first indication and the second indication include at least one of a color, a sound, a vibration, and an image.

4. The electronic device of claim 1, wherein the first indication indicates that the first session of the voice-based intelligent assistance service does not exist, and the second indication indicates an existence of the first session of the voice-based intelligent assistance service.

5. A system, comprising:
a communication interface;
a processor operatively coupled to the communication interface; and
at least one memory electrically coupled to the processor,
wherein the at least one memory stores instructions that, when executed, cause the processor to:
form a first session related to a first control device, wherein the first session lasts for a designated time duration and is scheduled to be released after the designated time duration is over,
receive a request for information on the first session through the communication interface from an electronic device including a user interface, a speaker, and a microphone,
in response to receiving the request before the designated time duration is over, transmit the information related to the first session to the electronic device,
wherein the information on the first session is related to the first control device and the designated time duration, and
wherein the electronic device, in response to receiving the information on the first session, provide a second control command to the first control device.

6. The system of claim 5, the instructions, in the first session, cause the processor to receive second control command from the electronic device and to transmit the received second control command to the first control device through the first session.

7. The system of claim 6, wherein the second control command does not designate a target to control.

8. The system of claim 5, wherein the information on the first session includes at least one of information on the first control device, information on a maintenance time of the first session, and information related to an operation state of the first control device.

9. A method of processing utterance performed by an electronic device, comprising:
forming a first session related to a first control device in response to a first control command acquired by a voice-based intelligent assistance service and designating the first control device, wherein the first session lasts for a designated time duration and is scheduled to be released after the designated time duration is over;
receiving a wake-up utterance for calling the voice-based intelligent assistance service;
in response to receiving the wake-up utterance after the designated time duration is over, providing a first indication indicating that the first session has been released; and
in response to receiving the wake-up utterance before the designated time duration is over, providing a second indication indicating that the first session is in progress.

10. The method of claim 9, further comprising:
based on that a second control command related to the wake-up utterance specifies a second control device, forming a second session with the second control device; and
providing the second control command to the second control device through the second session.

11. The method of claim 9, further comprising:
based on that a second control command related to the wake-up utterance does not specify a control device, providing the second control command by using the first session.

12. The method of claim 10, wherein the providing the second indication includes identifying the first session based on information related to the first session stored in the electronic device or an external device, and
wherein the information related to the first session is updated in response to forming the second session.

13. The method of claim 10, further comprising:

identifying an operation state of the first control device in which the first session is in progress;

releasing the first session when the operation state indicates that the first control device cannot process the second control command; and providing a first indication indicating that the first session has been released.

14. The method of claim 13, further comprising:

providing guide information indicating the operation state in which the first control device cannot process the second control command.

15. The method of claim 9, further comprising:

activating a first processor to receive the wake-up utterance; and in response to receiving the wake-up utterance, activating a second processor to receive a second control command, wherein the first processor consumes relatively less power than the second processor.

* * * * *